(12) United States Patent
Leiseder (10) Patent No.: US 9,593,704 B2
(45) Date of Patent: Mar. 14, 2017

(54) DEVICE FOR CONNECTING COMPONENTS

(71) Applicant: Ulrich Leiseder, Reinbek (DE)

(72) Inventor: Ulrich Leiseder, Reinbek (DE)

( * ) Notice: Subject to any disclaimer, the term of this patent is extended or adjusted under 35 U.S.C. 154(b) by 71 days.

(21) Appl. No.: 14/428,670

(22) PCT Filed: Sep. 17, 2013

(86) PCT No.: PCT/EP2013/069290
§ 371 (c)(1),
(2) Date: Mar. 17, 2015

(87) PCT Pub. No.: WO2014/041197
PCT Pub. Date: Mar. 20, 2014

(65) Prior Publication Data
US 2015/0233406 A1     Aug. 20, 2015

(30) Foreign Application Priority Data

Sep. 17, 2012   (DE) .................... 20 2012 008 847 U
Dec. 6, 2012    (DE) .................... 20 2012 011 684 U (51) Int. Cl.
*F16B 17/00*   (2006.01)
*F16B 5/00*    (2006.01)
*F16B 3/04*    (2006.01)

(52) U.S. Cl.
CPC ............... *F16B 17/00* (2013.01); *F16B 3/04* (2013.01); *F16B 5/0044* (2013.01); *F16B 5/0052* (2013.01); *Y10T 403/642* (2015.01)

(58) Field of Classification Search
CPC .. F16B 3/00; F16B 3/04; F16B 5/0052; F16B 5/0032; F16B 5/0044; F16B 5/0048;
(Continued)

(56) References Cited

U.S. PATENT DOCUMENTS 93,402 A  *  8/1869  Blake ........................ E05D 1/04
                                                    16/355
414,570 A  * 11/1889  Park ......................... E05B 41/00
                                                    292/150
(Continued)

FOREIGN PATENT DOCUMENTS

EP    1975335 A2   10/2008
EP    2273048 A2    1/2011

*Primary Examiner* — Joshua J Michener
*Assistant Examiner* — Matthew Gitlin
(74) *Attorney, Agent, or Firm* — Richard M. Goldberg (57) ABSTRACT

A device for connecting two construction components (10, 12) that are have engagement structures (16) on two connection surfaces (14) that are facing each other, in which the components (10, 12) have at least two pairs of oppositely disposed circular arc-shaped engagement structures (16) each of which extends over an angle of not more than 180° and has at least one open end, the engagement structures being arranged such that the center of the circular arc of the engagement structure of one pair is different from the center of the circular arc of the engagement structure of each other pair, and at least two connectors (22) are provided, each of which has engagement structures (24) complementary to the engagement structures (16) of one pair and adapted to be inserted in a rotary movement into the two engagement structures (16) from the open end.

14 Claims, 11 Drawing Sheets

(58) Field of Classification Search
CPC ...... F16B 5/008; F16B 5/0084; F16B 17/008; Y10T 403/64; Y10T 403/7018; Y10T 403/7064; Y10T 403/7092; Y10T 403/7094; Y10T 403/76; E05D 1/04; F16C 11/10

See application file for complete search history.

(56) References Cited

U.S. PATENT DOCUMENTS

| | | | | |
|---|---|---|---|---|
| 434,474 A * | 8/1890 | Simonds | ................ | F16C 19/30 384/608 |
| 819,098 A * | 5/1906 | Underhill | ................ | E05D 1/04 16/355 |
| 1,181,050 A * | 4/1916 | Woodfine | ............. | E05B 63/123 292/142 |
| 3,027,592 A * | 4/1962 | Schnur | ..................... | E05D 1/04 16/355 |
| 3,256,640 A * | 6/1966 | Schnur | ..................... | E05D 1/04 16/365 |
| 3,964,511 A * | 6/1976 | Cattermole | .............. | F16B 3/00 137/614.06 |
| 4,683,614 A * | 8/1987 | Anderson | ................ | E05D 1/04 16/362 |
| 5,039,118 A * | 8/1991 | Huang | ..................... | B62B 9/20 280/47.371 |
| 5,061,023 A * | 10/1991 | Soubliere | ................. | E05D 1/04 16/355 |
| 5,946,774 A * | 9/1999 | Ramsey | ................... | E05D 1/04 16/355 |
| 6,317,929 B1 * | 11/2001 | Ring | ....................... | E05D 1/04 16/355 |
| 8,573,849 B2 * | 11/2013 | Leiseder | ................ | E05D 11/04 384/452 |
| 2014/0178126 A1 * | 6/2014 | Burns | ..................... | F16B 7/182 403/343 |

* cited by examiner

DEVICE FOR CONNECTING COMPONENTS

BACKGROUND OF THE INVENTION

The invention relates to a device for connecting two construction components that have engagement structures on two connection surfaces that are facing each other.

Known in the art are connecting devices of the non-threaded type, such as plug-in connectors or so-called Hirth connectors which permit to form-fittingly immobilize the two construction components in all three degrees of freedom of movement in the direction in parallel with the plane of the connection surfaces. However, for establishing such a connection, the two construction components must be moved relative to one another in the direction normal to the connection surfaces.

On the other hand, flange-type connections are known in which a relative movement of the construction components in the direction normal to the plane of the flanges is not necessarily required, but free spaces must be present which permit that bolts for connecting the flanges are inserted or screwed-in into corresponding bolt holes. These bolts must be moved in the direction normal to the plane of the flanges.

EP 2 273 048 B1 discloses a connecting device having circular arc-shaped engagement structures and associated connectors which permits a relative rotation of the construction components.

SUMMARY OF THE INVENTION

It is an object of the invention to provide a connecting device which permits to form-fittingly immobilize the construction components relative to one another in all three degrees of freedom of movement in the direction normal to their connection surfaces and which does not require any movement whatsoever in the direction normal to the connection surfaces for establishing the connection.

In order to achieve this object, according to the invention, the construction components have at least two pairs of oppositely disposed circular arc-shaped engagement structures each of which extends over an angle of not more than 180° and has at least one open end, the engagement structures being arranged such that the centre of the circular arc of the engagement structure of one pair is different from the center of the circular arc of the engagement structures of each other pair, and at least two connectors are provided, each of which has engagement structures complementary to the engagement structures of one pair and adapted to be inserted in a rotary movement into the engagement structures of the pair from the open end.

Useful details and further developments of the invention are indicated in the dependent claims.

BRIEF DESCRIPTION OF THE DRAWINGS

Embodiment examples will be described in conjunction with the drawings, wherein.

DETAILED DESCRIPTION

Figure 1:
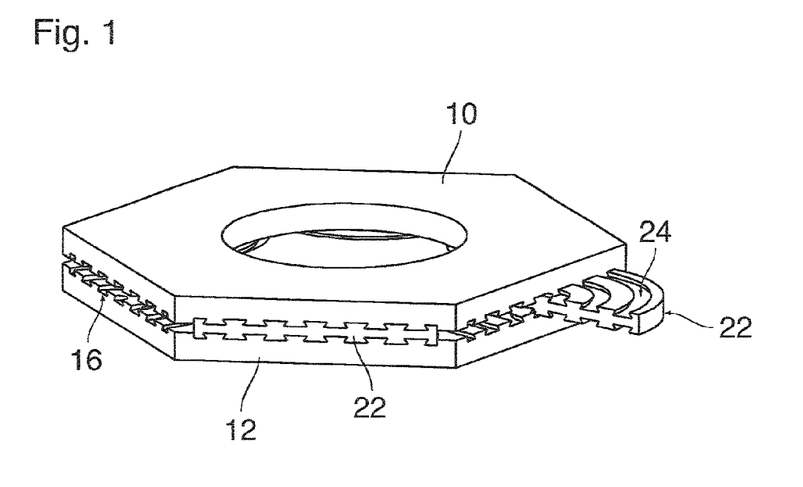
FIG. 1 is a perspective view of a connecting device according to the invention.
Figure 2:
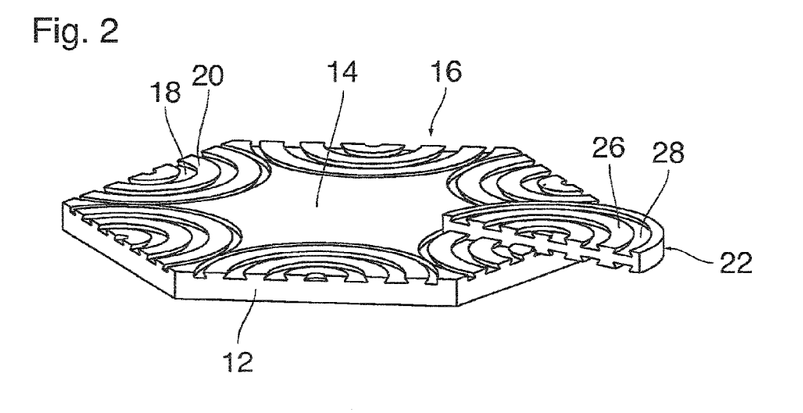
FIG. 2 is a view of parts of the device shown in FIG. 1.

FIGS. 1 and 2 show a connecting device which serves for connecting two construction components 10 and 12 with one another. In the example shown, the construction components 10 and 12 are shaped as flat flanges having a hexagonal contour, although they could have any arbitrary shape in principle.

What matters is only that the two construction components 10, 12 have connection surfaces 14 (FIG. 2) which are facing each other and which are at least approximately flat. Circular arc-shaped engagement structures 16 are formed in these connection surfaces, the engagement structures being configured as sets of semi-circular concentric grooves 18 and ribs 20 left between the grooves, in this example.

In the example shown, the engagement structures 16 of the two construction components 10, 12 are formed symmetrically, but this is not a necessary feature. It is only essential that the engagement structures of the two construction components 10, 12 form pairs that are disposed opposite to one another, and the centres of the circular arcs should at least roughly be aligned with one another.

Associated with each pair of engagement structures 16 is a connector 22 which has engagement structures 24 that are complementary to the engagement structures 16 of the pair, in the example shown (FIG. 2) in the form of ribs 26 having a profile complementary to that of the grooves 18, and grooves 28 having a profile complementary to that of the ribs 20.

In the example shown, the connectors 22 are configured as semi-circular disks, and they can be inserted in a rotary movement into the oppositely disposed engagement structures 16 of the corresponding pair, as has been shown on the right side in FIGS. 1 and 2, respectively. FIG. 1 shows, on the side of the construction components 10, 12 that are facing the viewer, a connector 22 that has been inserted completely, so that it completely fills the grooves 18 of the engagement structures 16 and its end face that corresponds to the diameter of the semi-circle is flush with the side surfaces of the construction components 10, 12. Open engagement structures 16 without connectors are shown on the left side in FIG. 1.

By the engagement of the circular arc-shaped grooves 18, 28 and ribs 20, 26, the two construction components are form-fittingly immobilized relative to one another, so that they may not be displaced relative to one another in the direction in parallel with their connection surfaces 14. When at least two connectors 22 have been inserted in the corresponding pairs of engagement structures, the construction components 10 and 12 may not be rotated relative to one another, neither.

In the example shown, the grooves 18, 28 have undercut profiles (dovetail profiles), so that the construction components 10, 12 are also immobilized form-fittingly relative to one another in the direction normal to the connection surfaces 14 (in vertical direction in FIGS. 1 and 2) by the engagement of the ribs 20, 26 in the grooves. When immobilization in that direction is not needed, the engagement structures may also be formed without undercut.

Figure 3:
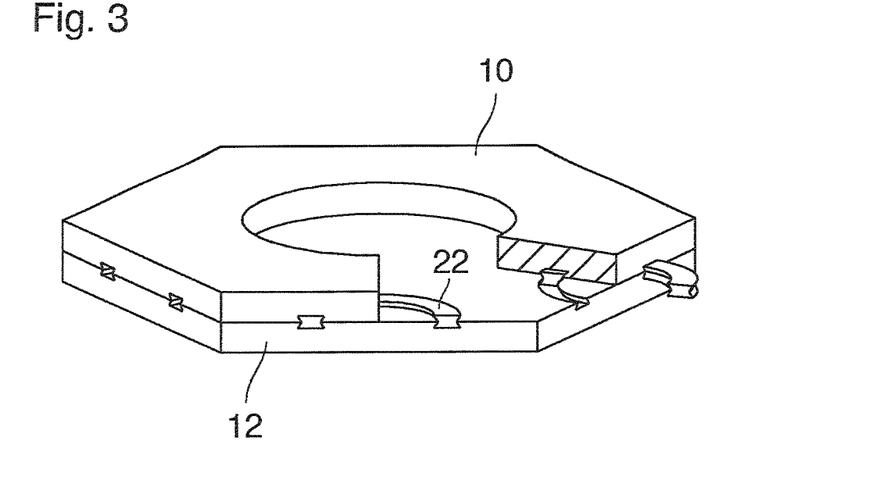
FIGS. 3 to 5 are views of a connecting device according to another embodiment and of parts thereof.
Figure 4:
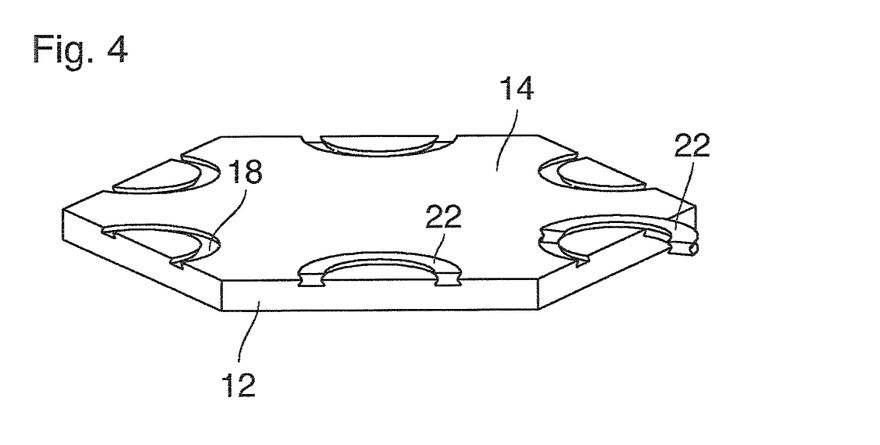
Figure 5:
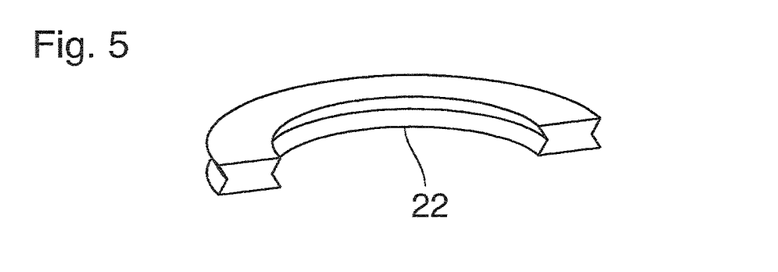

FIGS. 3 to 5 show an embodiment example that differs from the example described above in that the engagement structures of the construction components 10, 12 are each formed only by a single groove 18, and the associated connectors 22 are simply formed by half rings having a double-dovetail profile.

In both embodiments the engagement structures 16 may be formed easily and with high precision, e.g. by milling, and the complementary engagement structures 24 of the connectors 22 may be formed for example by molding, so that a precise fit is achieved and, accordingly, only little play exists between the inter-engaging structures, and they can yet be rotated relative to one another without too much resistance. Optionally, however, a certain play between the inter-engaging structures may be admitted on purpose, and/or chamfers or the like may be provided at the ends of the grooves and ribs for facilitating the insertion of the ribs in the grooves. Likewise is it possible that the ribs are configured to be elastic, e.g. by configuring them in the shape of two tongues that are biased against the flanks of the groove so as to eliminate any play.

The strength of the connection between the construction components 10 and 12 may be adjusted as desired by suitably selecting the number and the dimensions of the engagement structures 16.

Figure 6:
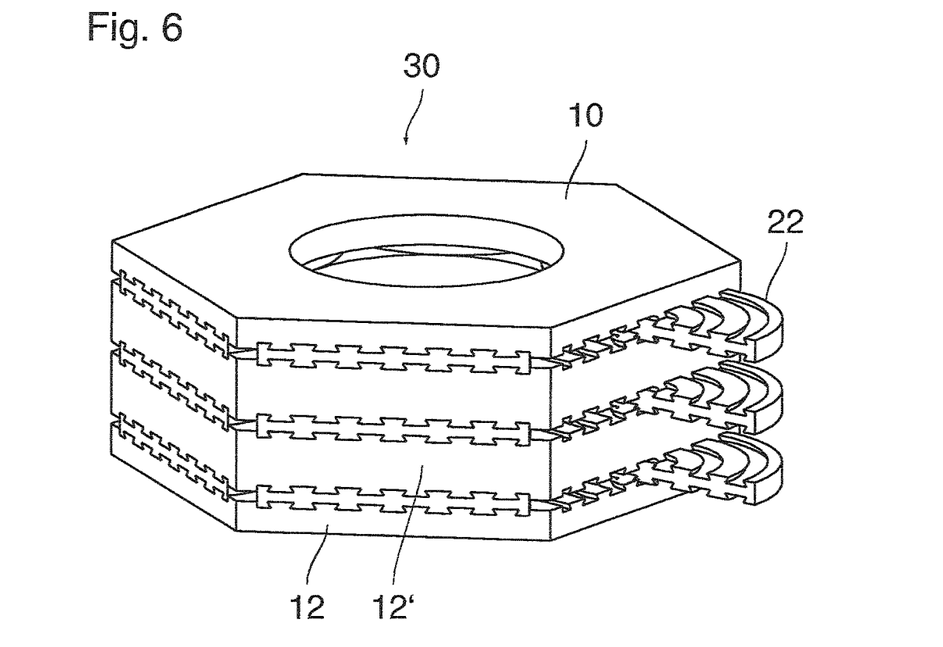
FIG. 6 is an example of use of the connecting device according to FIG. 1.

So, the connecting device may be used for example for forming relatively large-dimensioned machine components, even when they are highly loaded components such as shafts, by assembling several segments together. As an example, FIG. 6 shows a hexagonal shaft 30 formed of stacked construction components 10, 12 and further components 12' that have the same contour, the connections being respectively formed by connectors 22. To that end, the intervening construction components 12' have engagement structures 16 on both their top side and their bottom side.

Figure 7:
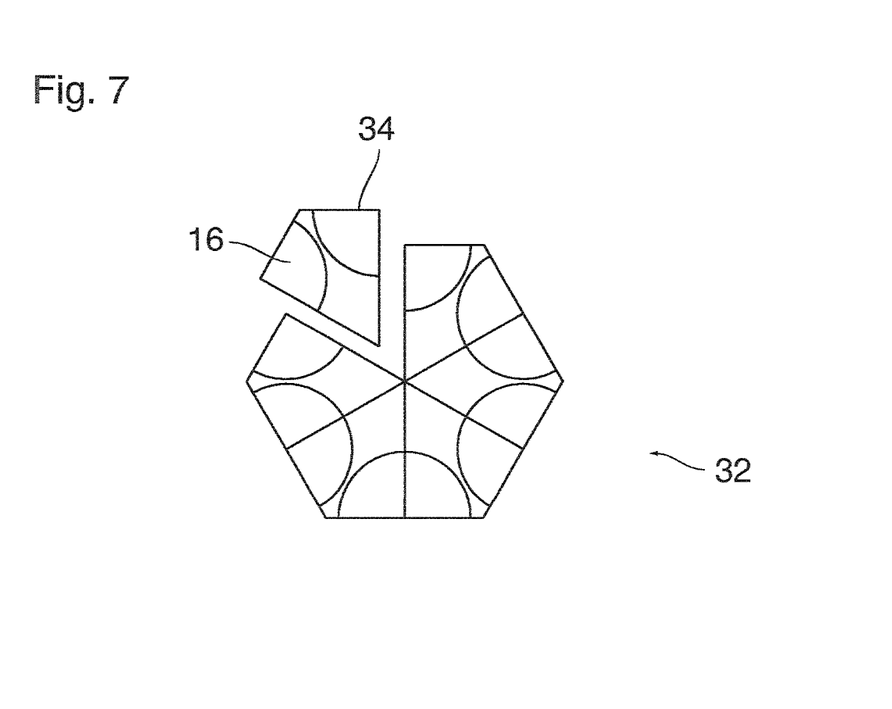
FIG. 7 is a schematic plan view of a connecting device according to another embodiment example.

The circular arc-shaped engagement structures 16 and 24 need not necessarily be semi-circles but may be circular arcs that cover a smaller angle. FIG. 7 shows schematically a plan view of a hexagonal prismatic body 32 assembled from quadrilateral prisms 34 that are shaped as pie slices. In this case, the engagement structures 16 which have been shown here only schematically are configured as quarter circles and serve for connecting several of the prisms 34 to form a stack, in analogy to FIG. 6. Other connecting devices, which have not been shown here, may be used for interconnecting the prisms 34 to form the hexagonal prismatic body 32. If, however, the semi-circular connectors according to FIG. 6 are used in FIG. 7 in place of a quarter-circular connectors, then it is possible to use these connectors also for interconnecting the prisms that are disposed in the same layer of the stack, with the each connector engaging in the engagement structures of two prisms 34.

Figure 8:
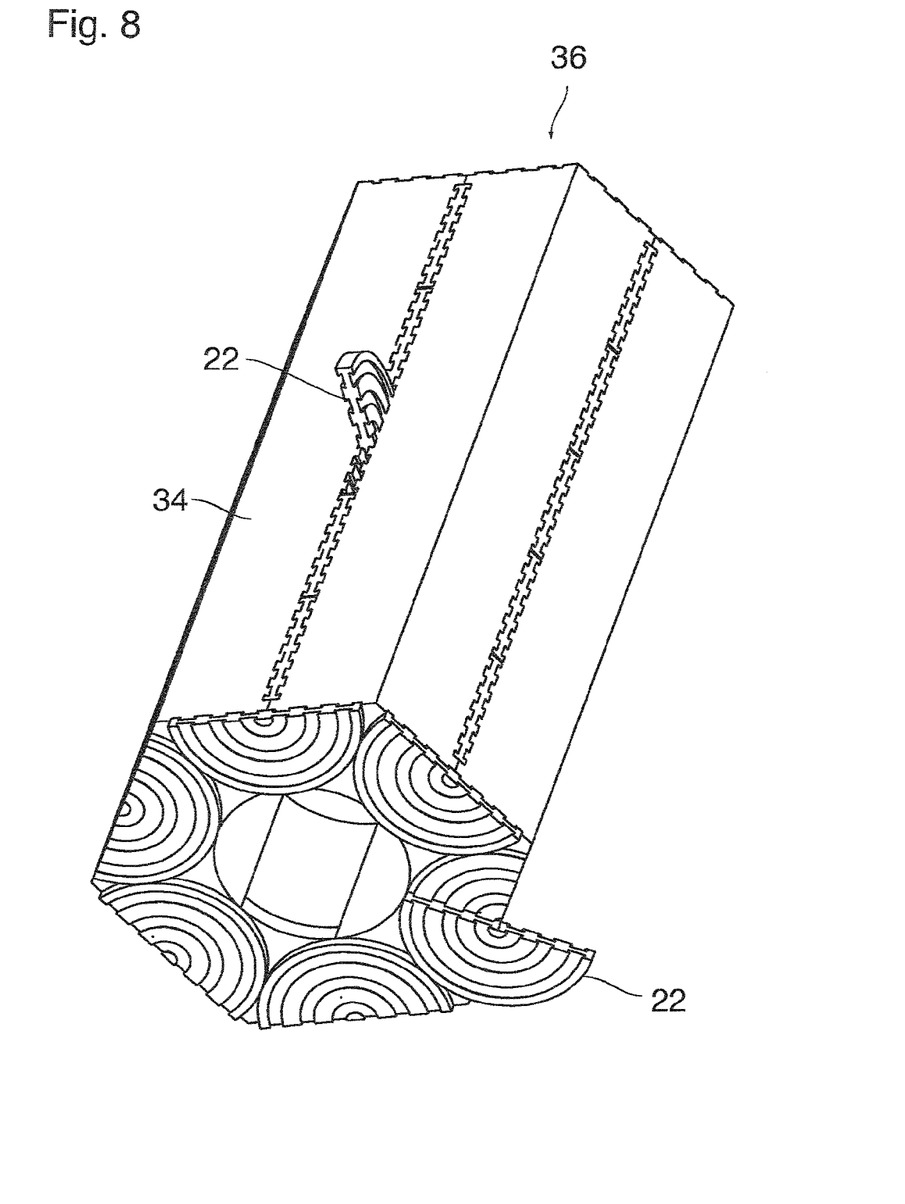
FIG. 8 is another example of use for the connecting device according to FIG. 1.

FIG. 8 shows a hexagonal prismatic body 36 which is assembled from several prisms 34 that extend in longitudinal direction and are joined together in circumferential direction, similarly as in FIG. 7, with the connecting devices according to the invention, having the connectors 22, serving not only for interconnecting the prisms 34 in longitudinal direction but also for interconnecting the prisms in circumferential direction.

Figure 9:
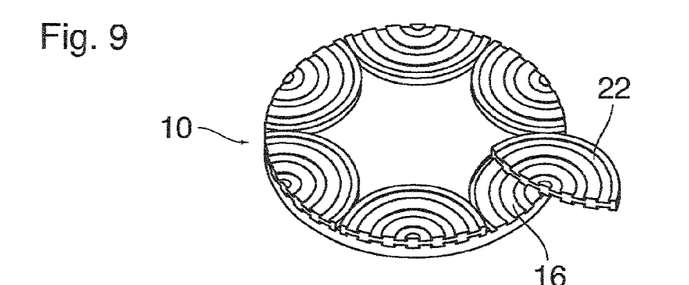
FIG. 9 shows a connecting device according to another embodiment example.

As is shown in FIG. 9, the invention permits also a stack-like interconnection of round construction components 10. Then, the engagement structures 16 and the connectors 22 are not shaped as semi circles but are rounded in accordance with the rounded contour of the construction component on the side that interconnects the two ends of the circular arc, so that, when fully inserted, they are flush with the peripheral surface of the component 10.

Figure 10:
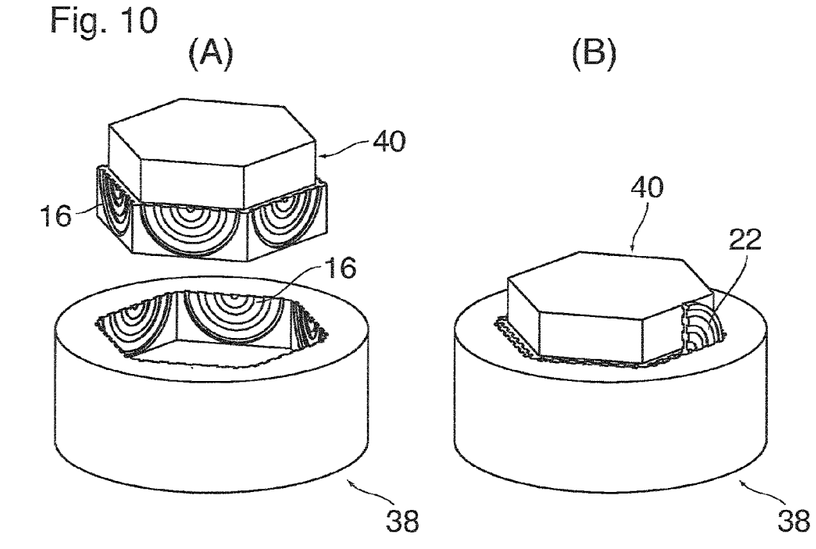
FIGS. 10 to 13 show further examples of use of the invention.

FIG. 10 (A) is a view of a mortise joint between a cylindrical shaft 38 and a polygonal shaft 40, the connection being achieved by means of engagement structures 16 that are formed at the external faces of the shaft 40 and in the mortise of the shaft 38.

FIG. 10 (B) shows the same mortise joint in an almost completed state.

Figure 11:
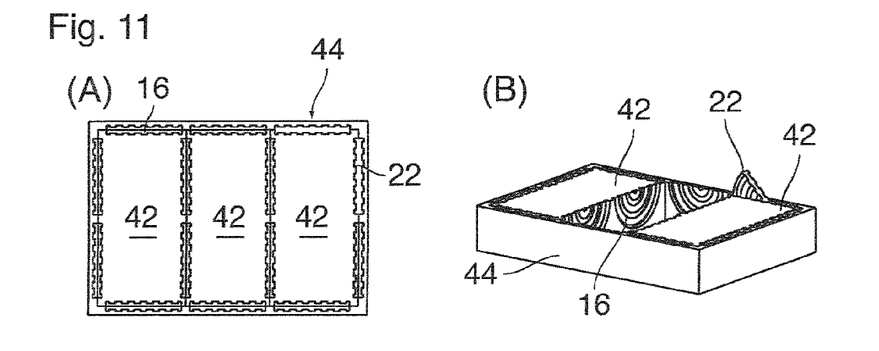

FIG. 11 (A) illustrates, in a plan view, the use of connecting devices according to the invention for fixing three cuboid bodies 42 side by side in a box-shaped casing 44. The connecting device having the engagement structures 16 and the connectors 22 is used here on the one hand for fixing the bodies 42 at the internal walls of the casing 44 and have also the function to interconnect the bodies 42 at the surfaces facing each other. In this way, the bodies 42 are very safely immobilized in the casing 44. FIG. 11 (B) is a perspective view showing the casing 44 with two of the bodies 42.

Figure 12:
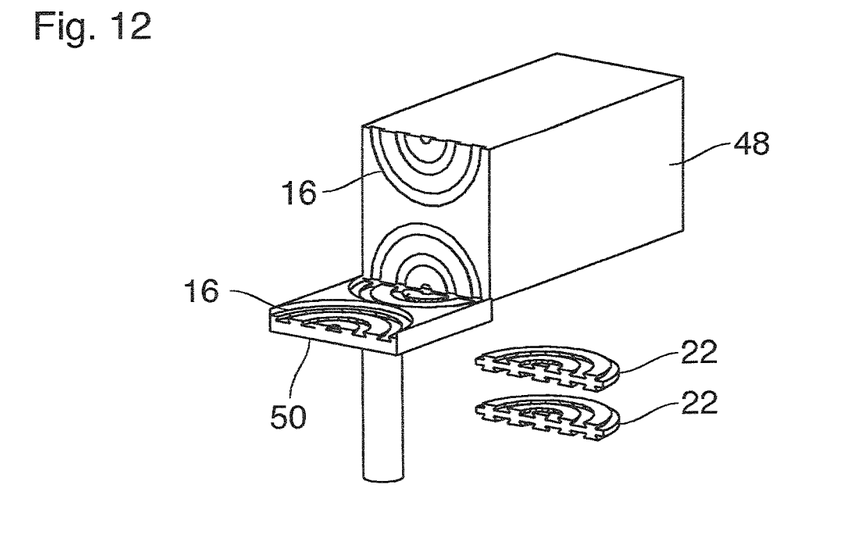
Figure 13:
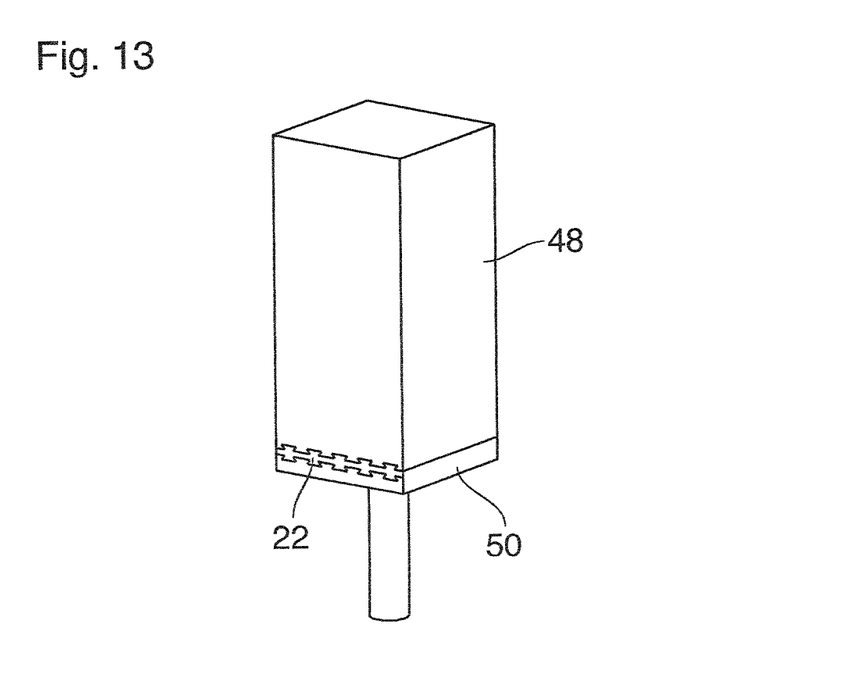

FIGS. 12 and 13 illustrate a simple use of the device according to the invention, having only two connectors 22, for connecting a post 48 that may be made of wood, for example, to a metal post anchor 50.

Figure 14:
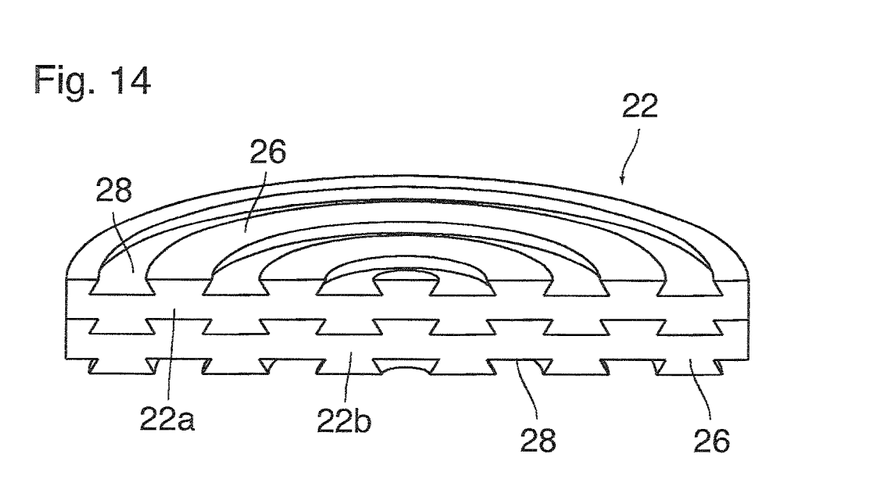
FIG. 14 shows a connector of a device according to another embodiment example.

Whereas, in the embodiments described so far, a one-piece connector 22 is associated with each pair of engagement structures 16, connecting devices may also be conceived in which a multi-part connector 22 is used, as shown in FIG. 14. This connector is formed by two-semi circular disks 22a and 22b which have respective engagement structures in the form of ribs 26 and grooves 28 on both sides and may thus be inserted into the engagement structures 16 in the same way as the connectors 22. In the example shown in FIG. 14, the two disks 22a and 22b have identical shapes, and the engagement structures on the opposite sides of the same disk are not symmetric but complementary to one another. Therefore, it is also possible, if necessary, to form connectors with three or more disks that are stacked to one upon the other and inter-engaged with one another in the same way. It will be understood that the connector 22 shown in FIG. 14 will be used together with construction components the engagement structures 16 of which are also not symmetric but complementary to one another.

Figure 15:
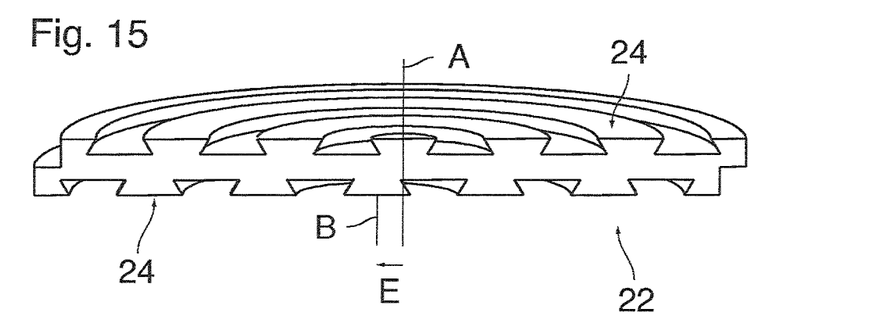
FIG. 15 shows a connector for a device for clamping construction components together.

FIG. 15 shows a connector 22 in the form of a single disk, wherein the engagement structures 24 on the top side and the bottom side are disposed to be slightly eccentric. The engagement structure on the top side is formed by grooves and ribs that are centered on an axis A, whereas the grooves and ribs of the engagement structure on the bottom side are centered on a slightly offset axis B. The eccentricity may be characterized in size and direction by a vector E. In the example shown, the vector E is parallel with the straight edge of the semi-circular disk.

Connectors of the type shown in FIG. 15 permit to clamp together the connecters and the construction components connected thereby, in order to eliminate any play in the engagement structures.

Figure 16:
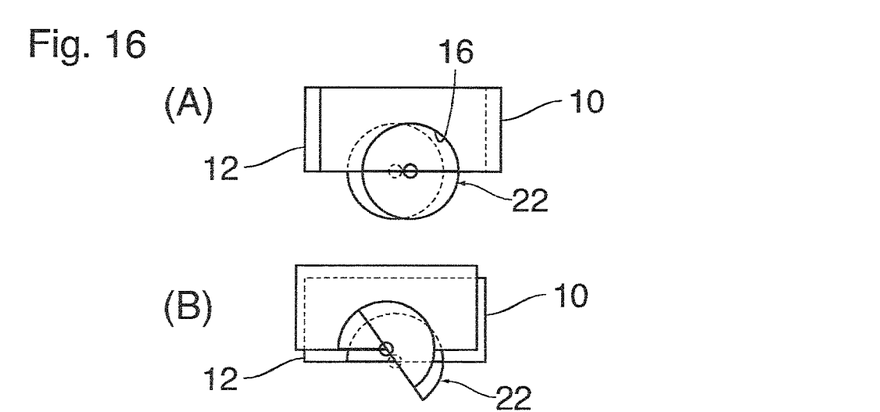
FIG. 16 shows schematic sketches for explaining the principle of the device in FIG. 15.

The principle has been illustrated in FIG. 16. FIG. 16 (A) shows schematically two rectangular construction components 10, 12 stacked one upon the other in slightly offset positions, so that the lower component 12 is largely hidden. For simplicity, only a single semi-circular engagement structure 16 has been shown for each of the two components. The semi-circular connector 22 is shown in the state immediately before it is inserted, i.e. in a state in which its straight edge engages the edges of the components 10 and 12 that are flush with one another. The centre of the engagement structure on the top side of the connector has been shown in continuous lines, whereas the centre of the engagement structure on the bottom side has been shown in dashed lines. The offset between the two components 10 and 12 corresponds to the eccentricity of the engagement structures of the connector 22.

Now, is shall be assumed that the connector 22 is inserted into the engagement structures 16 by rotating it in counter-clock sense, with the component 12 being fixed and the rotation being performed about the centre of the bottom engagement structure (dashed). FIG. 16 (B) shows the situation after a rotation of about 135°. It can be seen that the two components 10, 12 are displaced relative to one another in the plane of their connection surfaces, the displacement being one on a circular arc the radius of which corresponds to the eccentricity E. After a rotation of 180°, i.e. when the connector 22 is flush with the edges of the components 10, 12, the component 10 would be offset relative to the component 12 in the opposite direction (as compared to FIG. 16 (A)).

When the construction components are connected to one another by two or more connectors, the effect described above may be utilized for clamping the construction components and the connectors together. If exactly two connectors are provided, their eccentricities E should be of equal size but in opposite direction. The amount of the eccentricity has been exaggerated in FIGS. 15 and 16 and should in practice be in the order of magnitude of the play between the ribs and grooves of the engagement structures, so that it is still possible to insert the connectors into the engagement structures 16 of the construction components in spite of the eccentricity. Then, the one connector will have the tendency to shift the plates in one direction, whereas the other connector has the tendency to shift them in the opposite direction. Since both construction components are rigid, however, they are clamped together in this way.

In order to facilitate the insertion of the eccentric connectors, the engagement structures in the two construction components 10, 12 may be formed such that, when the two components 10, 12 are aligned with one another, the engagement structures are slightly eccentric relative to one another. The displacement of the components that occurs when a single (eccentric) connector is inserted, will compensate or over-compensate this eccentricity, so that, when two or more connectors are used, the construction components could again be firmly clamped together.

The eccentricities E may also be orthogonal to or form any other angle with the edge of the construction components in which the engagement structures 16 open out. For example, in the embodiment shown in FIG. 1, a clamping effect for the components 10 and 12 could be achieved by an arrangement in which the eccentricities of the connectors 22 that are inserted into the six side faces of the components would cause displacements of the top component 10 relative to the bottom component 12 that are alternately directed inwardly and outwardly. On the other hand, when the eccentricities E of all six connectors would point in the same circumferential direction in the device shown in FIG. 1, a slight relative rotation of the components 10 and 12 could be achieved.

Figure 17:
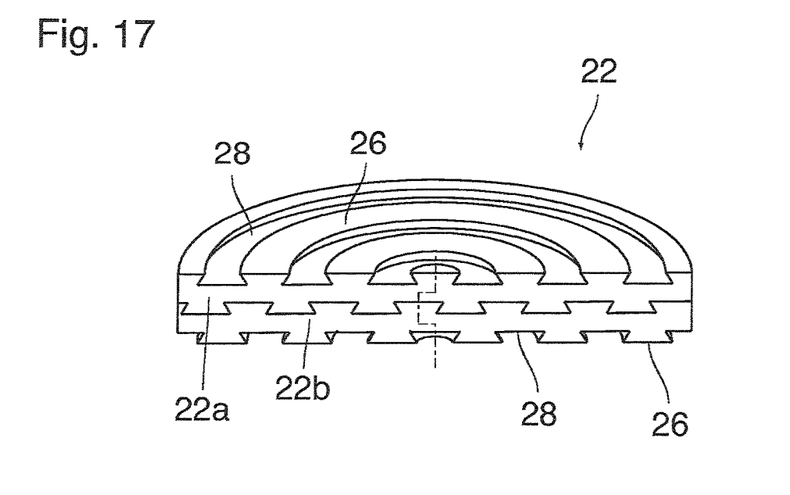
FIGS. 17 and 18 show a multi-component connector for clamping-type connections.

FIG. 17 shows a multi-component connector 22 shaped as a double eccentric and composed of two semi-circular disks 22a and 22b similarly as the connector in FIG. 14. In this case, however, the engagement structures on the top side and the bottom side of each of the two disks are eccentric, with the eccentricities of two disks 22a and 22b being of equal size but opposite direction. Consequently, in the position shown in FIG. 17, the eccentricities cancel each other so that the connector 22 as a whole behaves like a one-part non-eccentric connector. When, however, the two disks 22a and 22b are rotated relative to one another, one obtains a resulting eccentricity that has the tendency to displace the construction components relative to one another, so that a clamping effect can again be achieved together with at least one second (eccentric or non-eccentric) connector.

Figure 18:
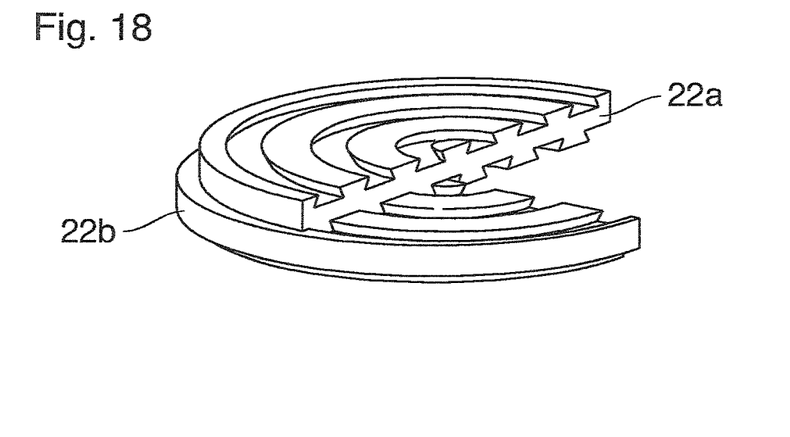

FIG. 18 shows the two disks 22a and 22b of the connector according to FIG. 17 in a position where they are rotated relative to one another by an angle of about 90°.

Optionally, the disks 22a and 22b, rather than having a semi-circular shape could also be shaped as obtuse sectors extending over a circular arc of less than 180°, so that, even when the disks are slightly rotated relative to one another, the connector could still be accommodated completely within the contours of the construction components 10, 12.

On the other hand, it is also possible to provide a connector in which the disks 22a and 22b are not shaped as semi-circles but as full circles. Then, in order to connect to the construction components 10, 12, additional semi-circular (or sector-shaped) connectors would be needed that are in engagement with the grooves 28 in the outward surfaces of the disks 22a and 22b and are thus rotatable in these (full circular) grooves, so that they may be inserted by rotation into the engagement structures 16 of the construction components 10, 12. This solution has the advantage that the extent of the eccentricity can be adjusted by rotating the disks 22a, 22b relative to one another without changing the angular position of the semi-circular connectors in the engagement structures 16. A relative displacement and a clamping of the components can then be obtained by a joint rotation of the disks 22a, 22b relative to the semi-circular connectors, again without changing the angular position of the semi-circular connectors in the engagement structures 16. However, the full circle disks 22a, 22b would project beyond the contour of the components 10, 12 even after the connection has be established.

When the grooves 28 are not undercut, the semi-circular connectors may be inserted into the disks 22a, 22b even at a later stage. Otherwise, the full circle disks 22a, 22b would have to be assembled from two halves that are initially separated from one another and into which the semi-circular connectors are inserted, before the two halves are fitted together to form the full circle.

Figure 19:
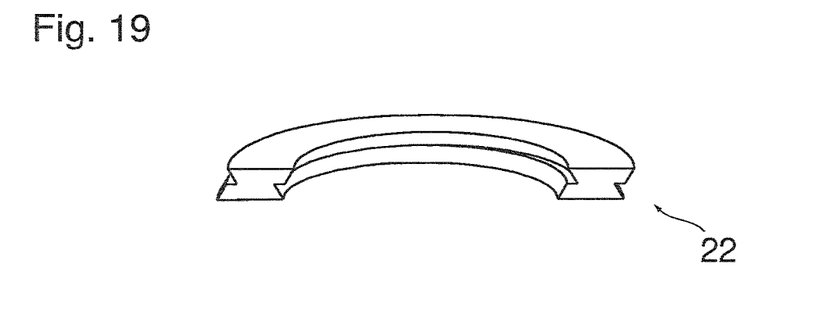
FIG. 19 shows a connector according to another embodiment.

FIG. 19 illustrates the possibility that an eccentric (in this case one-piece) connector may also be shaped as a single half ring, similarly as in FIG. 2.

Figure 20:
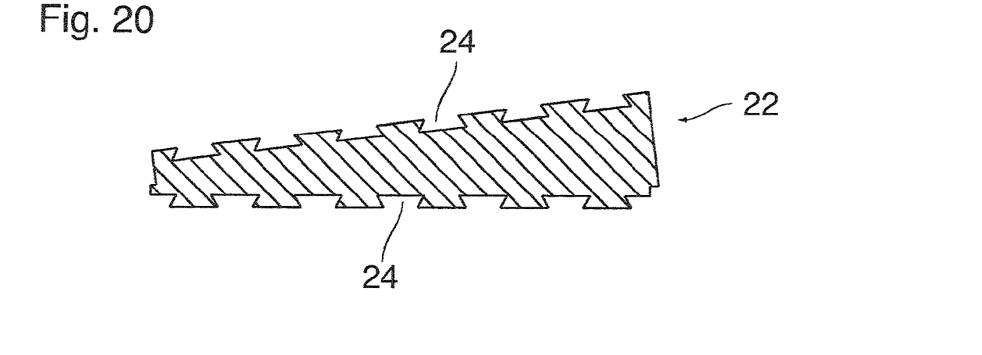
FIGS. 20 to 23 show further embodiment examples for connecting devices for clamping construction components together.
Figure 21:
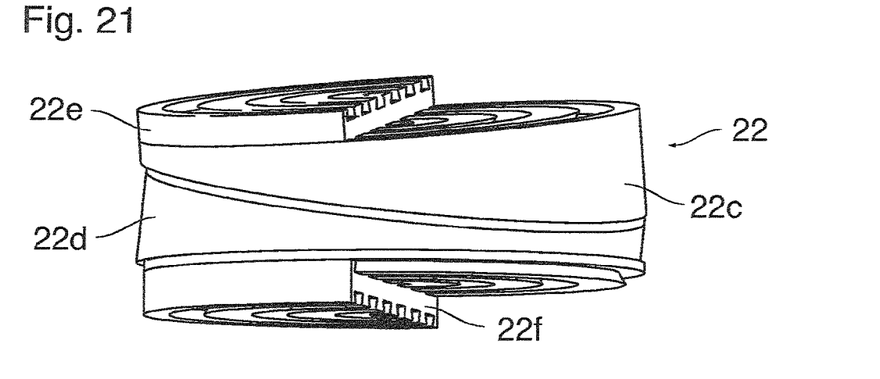

Another possibility to obtain a clamping-type connection of the construction components is to use wedge-shaped connectors rather than eccentric connectors. An example of an (exaggeratedly) wedge-shaped connector 22 has been shown in FIG. 20. In practice, the change in thickness of the connector should again be in the order of magnitude of the play of the engagement structures 24 in the engagement structures 16 of the construction components 10, 12, or the planes of the engagement structures 16 in the components 10, 12 should be slightly inclined relative to the connection surfaces 14 in order to permit the connector to be inserted. When, then, the connector 22 is inserted (rotated) further, the wedge-shape results in a tilting and tumbling relative movement of the components 10, 12. The clamping effect is achieved by using at least two connectors which have the tendency to tilt the construction components into different directions. For this variant, FIG. 21 illustrates an embodiment of a composite connector having two wedge-shaped disks 22c, 22d that are configured as full circles and are in interengagement with one another and each of which is rotatably engaged with another connector that is shaped as a semi-circular disk 22e, 22f. At their outer surfaces, the disks 22e and 22f have engagement structures which engage in the engagement structures 16 of the construction components 10, 12.

Figure 22:
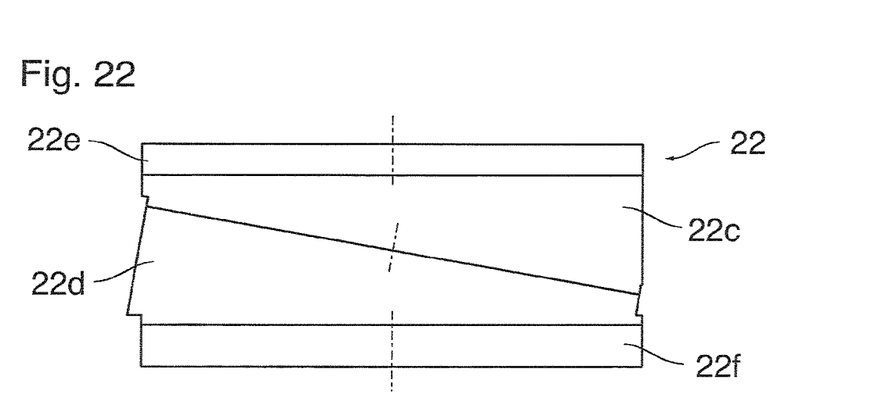

FIG. 22 shows this connector in a condition in which the wedge-shaped disks 22c, 22d have been rotated just so far that their wedge shapes cancel each other, so that the axis of the semi-circular disks 22e an 22f are aligned with one another. In this case, the two disks 22c and 22d can be rotated together without causing the axes of the disks 22e and 22f to tumble and without the components 10, 12 connect thereto being tilted relative to one another. When, however, the disks 22c and 22d are rotated relative to one another, the axes of the disks 22e and 22f form a (small) angle with one another, and the construction components 10, 12 are tilted or clamped accordingly.

In contrast to eccentric connectors, two or more wedge-shaped connectors can also lead to a clamping effect on the construction components even when all connectors have the tendency to tilt the construction components relative to one another by the same angle and in the same direction. The reason is that a relative tilting of the construction components would lead to a change in the distance between the connection surfaces 14, whereas, on the other hand, this distance is determined by the configuration of the individual connectors. However, a relative rotation of the disks 22c and 22d results not only in a tilting of the axes, but also in a change of effective thickness of the multi-component connector. When a plurality of connectors are used, it is therefore also possible to use an arrangement in which the tilting movement and the change in distance are compatible with one another, so that, rather than being clamped, the construction components are really tilted relative to one another, e.g. in order to correct a possible misalignment.

Figure 23:
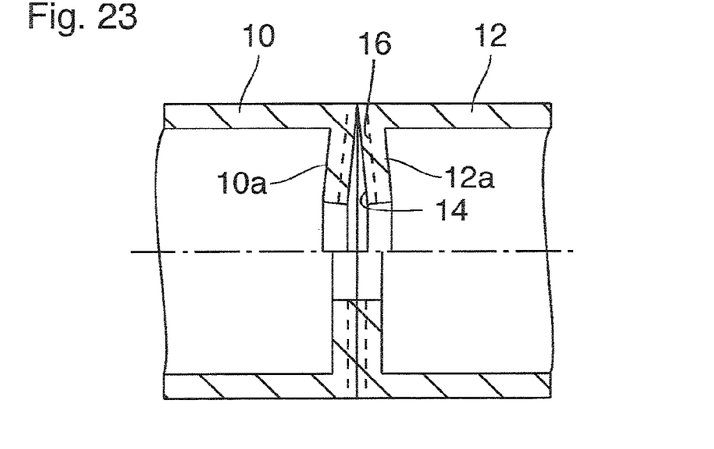

Another possibility of a clamping-type connection between two construction components 10, 12 has been shown in FIG. 23. In this example, the components 10, 12 have the shape of hollow profiles having respective flanges 10a, 12a at the ends facing each other. The faces of the flanges that face each other form the connection surfaces 14 in which the engagement structures 16 for the connectors (not shown here) are formed, with the engagement structures 16 (which have only been shown schematically here) being now necessarily formed with an undercut. The top part of FIG. 23 shows the flanges 10a, 12a in the non-loaded state. In this state, the flanges assume a position in which their connection surfaces 14 are slightly flaring. In contrast, the lower half of FIG. 23 shows the flanges in the condition in which their connection surfaces are pressed against each other with a certain force. In this condition, the connectors may be inserted, so that, with their undercut engagement structures, they will retain the flanges in the condition butted against one another. As the inner ends of the flanges will have the tendency to spring back into the position shown in the top part of FIG. 23, the connectors are held under tension, and the outer ends of the flanges—and, consequently, the construction components 10, 12—are firmly pressed against one another.

Figure 24:
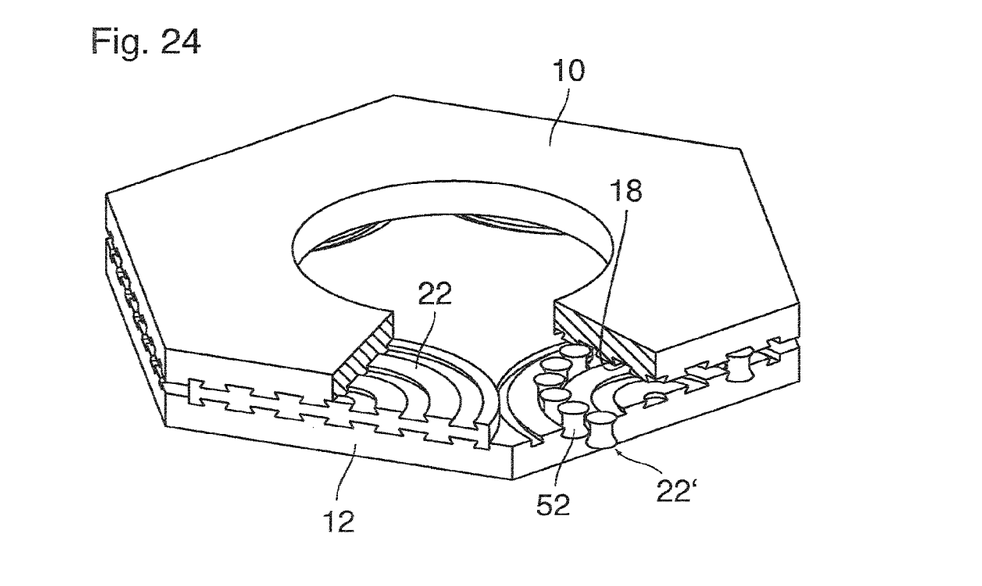
FIG. 24 is a view, partly broken way, of a connecting device having anther type of connector.

FIG. 24 shows an embodiment that differs from the embodiment according to FIG. 1 in that the connector 22 shaped as a semi-circular disk is replaced by a connector 22' formed by a plurality of double-cone rollers 52 each of which has one conically flaring end accommodated in the undercut groove 18 of the engagement structure of the component 10 and another conically flaring end accommodated in the undercut groove of the engagement structure of the other component 12. In order to "insert" this connector 22' in into the engagement structures 16, the rollers 52 are simply pushed into the grooves from the open end of the grooves, so that each roller will push-on the roller that has been inserted earlier.

Of course, corresponding rollers 52 may also be inserted in the other grooves of the engagement structures 16, and connectors of this type may be used for all engagement structures of the construction components 10 and 12. The advantage is that the rollers 52 may be fabricated very efficiently and permit to form connectors with different shapes and sizes. Rather than pushing the rollers individually into the grooves, it is also possible to thread the rollers on a string or to mount them in a cage similar to roller balls in a ball-bearing. In place of the rollers, bodies with any other shape may also be used.

Figure 25:
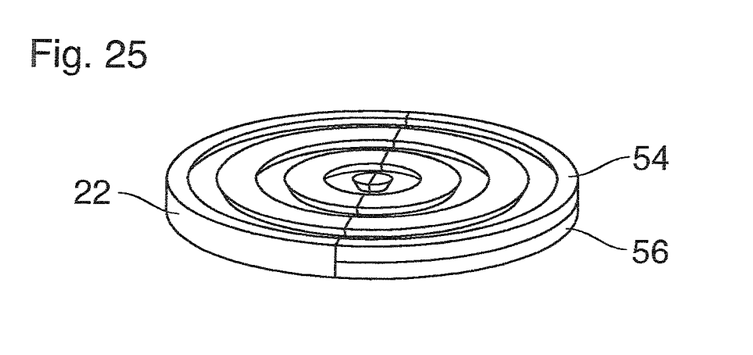
FIG. 25 shows a connector and a mounting aid.

In the embodiment examples that have been described so far, the grooves 18 of the engagement structures remain open when no connectors have been inserted. If this is not desired for aesthetic reasons, a combination of a semi-circular disk-shaped connector 22 and two filler bodies 54, 56 may be used, as is shown in FIG. 25. The filler bodies 54, 56 are also shaped as semi-circles and have the same engagement structures as the connector 22 but have only half the thickness of the connector 22 and have a flat semi-circular surface on the side opposite to the engagement structure. In the condition shown in FIG. 25, the filler bodies are butted against other with these flat surfaces, so that they supplement the connector 22 to a full circle.

The filler bodies 54, 56 may be inserted into the engagement structures 16 of the components 10, 12 in place of the connector 22, so that the engagement structures are filled up, but without actually joining the construction components together. Then, when it is desired to establish a connection by means of the connector 22, the connector 22 is inserted into the engagement structures in the usual way, whereby the filler bodies 54, 56 are pressed out of the engagement structures.

Conversely, it is possible to remove the connector 22 from the engagement structures 16 by pushing-in the filler bodies 54, 56 again.

In order to facilitate the insertion of the connector 22 and/or the filler bodies 54, 56 into the engagement structures 16, the connector 22 and the filler bodies 54 may be provided with inter-engaging alignment pins and holes at their ends. Optionally, the connector 22 and the filler bodies 54, 56 may be corrugated at their outer peripheral surface, so that the parts which supplement each other to form a full circle may be rotated more easily in the engagement structures by rubbing with a thumb over the peripheral surface of the full circle that projects beyond the edge surface of the construction components 10, 12. In this way, the filler bodies 54, 56 may also be used as a mounting aid.

Figure 26:
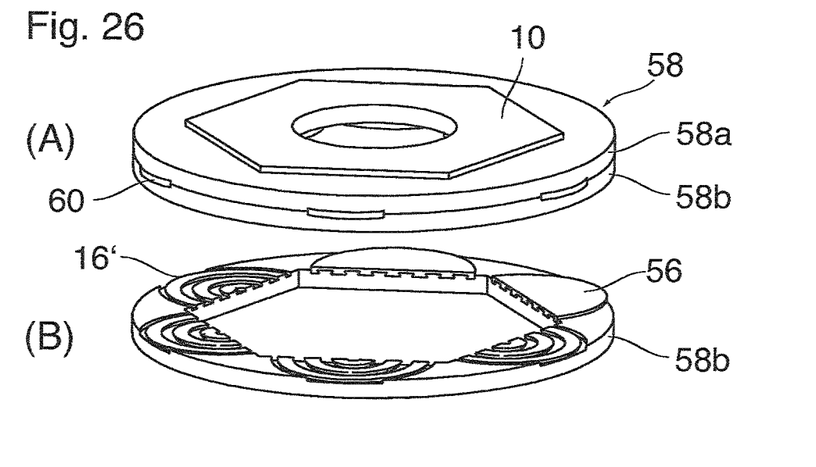
FIGS. 26 and 27 show another embodiment example of a connecting device with mounting aid.
Figure 27:
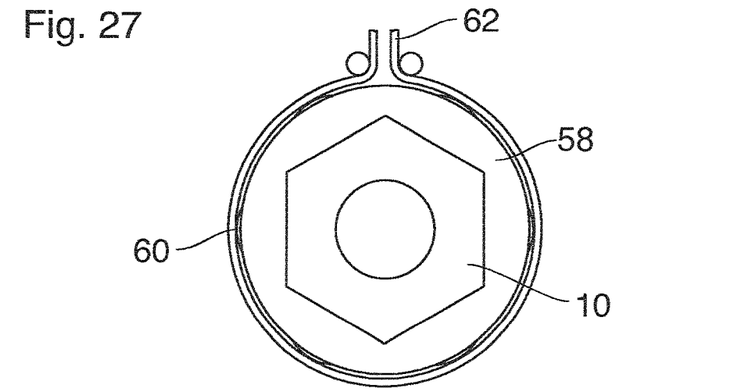

A further development of this idea has been illustrated in FIGS. 26 and 27.

FIG. 26 (A) is a perspective view of an annular frame 58 which encircles the two construction components 10, 12 that are to be connected to one another or have been connected already (only the component 10 is visible here). The frame 58 is composed of two flat disks 58a, 58b stacked to one upon the other. The lower disk 58b has been shown separately in FIG. 26 (B). It can be seen that this disk has (in its top surface) engagement structures 16' that correspond to the engagement structures 16 of the components 10, 12. Together with the corresponding engagement structure 16 of the component 10, 12 each engagement structure 16' forms a system of grooves and ribs in the form of concentric full circles which are however divided into half circles at the external surface of the components 10, 12 and the internal surface of the frame 58 facing the same. The arrangement of connectors 22 and filler bodies 54, 56 as shown in FIG. 25 may now be inserted into this structure. For example, as has been shown for two of the engagement structures in FIG. 26 (B), the filler bodies 56 may be inserted into the engagement structure 16' while the frame 58 is still separated from the components 10, 12.

Now, it shall be assumed that the construction components 10, 12 are connected to one another by the connectors 22. When the connection is to be disassembled, the frame 58 with the filler bodies 54, 56 inserted therein may be thrust over the interconnected components 10, 12, so that the filler bodies 54, 56 will respectively supplement the connectors 22 to full circles. As can be seen in FIG. 26 (A) and FIG. 27, the outer peripheral edges of the full circular disks that have been formed in this way project slightly beyond the outer periphery of the frame 58. These projecting edges 60 may therefore serve as a handle for synchronously rotating the full circular disks. When all disks have been rotated by 180°, the filler bodies 56, 58 are received in the engagement structures 16 of the components 10, 12, so that these components are now separated from one another, whereas, conversely, the connectors 22 are received in the engagement structures 16' of the disks 58a and 58b and now interconnect these disks. If desired, the frame 58 may be withdrawn in one piece from the components 10, 12 which are loosely stacked one upon the other. By reversing the process described above, the components 10 and 12 may just as easily be connected again.

For synchronously driving the filler bodies and connectors, suitable drive mechanisms can be provided. For example, the peripheral edges of the full circular disks formed by the connectors and the filler bodies may be configured as toothed gears that mesh with a toothed belt 62 (FIG. 27) that encircles the outer periphery of the frame 58. Optionally, these toothed gears may mesh with a ring gear that encircles the frame 58. Likewise is it possible to provide a sun gear in the interior of the components 10, 12, the sun gear being rotatable on an axis that passes through the centre of the components 10, 12 and meshing with the toothed edges 60 like in a planetary gear.

Any of these drive mechanisms provides a fast-lock coupling with which the components 10, 12 may quickly and easily and safely be connected with one another and disconnected from one another.

What is claimed is:

1. A device for connecting two construction components comprising:
    two construction components having facing surfaces arranged in superimposed face to face relation with each other, with engagement structures on said superimposed facing surfaces that are facing each other, the engagement structures having at least two pairs of oppositely disposed circular arc-shaped engagement structures each of which extends over an angle of not more than 180° and has at least one open end, the engagement structures being arranged such that a center of the circular arc of the engagement structure of one pair is different from a center of the circular arc of the engagement structure of each other pair, and
    at least two connectors, each of which has engagement structures complementary to the engagement structures of one pair and adapted to be inserted in a rotary movement into the two engagement structures from one said open end such that the at least two connectors are sandwiched between the superimposed facing surfaces.

2. The device according to claim 1, wherein the engagement structures of the components are open at both ends towards an edge surface of the corresponding components.

3. The device according to claim 2, wherein the connectors are sector shaped and bounded to one part by a circular arc and to another part by an edge that is shaped such that, when each connector is completely accommodated in the engagement structures, the connector is flush with a common edge surface of the components.

4. The device according to claim 1, wherein the engagement structures of the components and the complementary engagement structures of the connectors each comprise a sequence of concentric grooves and ribs.

5. The device according to claim 1, wherein the engagement structures of the components and the complementary engagement structures of the connectors each comprise at least one undercut groove and a rib complementary thereto.

6. The device according to claim 1, comprising at least one said connector in which engagement structures that are complementary to the engagement structures of one said component, and engagement structures that are complementary to the engagement structures of another said component are arranged to be eccentric relative to one another.

7. The device to claim 1, comprising at least one said connector that is wedge-shaped, such that engagement structures thereof that are complementary to the engagement structures of the two components are formed in planes that are inclined relative to one another.

8. The device according to claim 1, wherein at least one connector is a multi-part connector having two disks that are connected to one another by rotatable inter-engaging engagement structures.

9. The device according to claim 1, wherein at least one pair of oppositely disposed engagement structures of the components is formed on flanges that are biased such that their connection surfaces flare apart as long as they are not connected by an associated one of the connectors.

10. The device according to claim 1, comprising at least one connector that is formed by a sequence of one of:
    loosely engaging interconnected bodies and
    flexibly interconnected bodies
each of which has one end received in a cross-section of a groove of the engagement structure of one component, and another end received in a groove of the engagement structure of the other component.

11. The device according to claim 1, further comprising at least one filler body that has a shape complementary to an engagement structure of one of the components and is adapted to be inserted into that engagement structure in place of the connector.

12. The device according to claim 11, wherein the connector and two filler bodies stacked one upon the other in the direction of the thickness of the connector are configured to supplement each other to form a full-circular disk.

13. The device according to claim 12, further comprising a frame that encircles the components and has engagement structures that are open towards the components and adapted to receive, upon choice of the user, either the connectors or the filler bodies that supplement the connectors.

14. The device according to claim 13, further comprising a drive mechanism for synchronously driving the full-circular disks that are rotatable in the components and the frame.

* * * * *